United States Patent [19]

Hopper

[11] 4,247,599

[45] Jan. 27, 1981

[54] COMPOSITE SHEET MATERIAL HAVING LOW EMITTANCE CHARACTERISTICS

[75] Inventor: Thomas P. Hopper, Durham, Conn.

[73] Assignee: Insulating Shade, Branford, Conn.

[21] Appl. No.: 972,734

[22] Filed: Dec. 26, 1978

[51] Int. Cl.³ .............................. E06B 9/08; E04B 1/62; G02B 5/20; B32B 15/08
[52] U.S. Cl. .............................. 428/458; 160/121 R; 350/1.7; 350/166; 350/439; 350/311; 427/160; 428/216; 428/523; 428/913; 428/920
[58] Field of Search ................... 160/121 R; 350/1.7, 350/166, 196, 311; 351/44, 163; 427/160; 428/216, 458, 461, 336, 523, 913, 920

[56] References Cited

U.S. PATENT DOCUMENTS

| Re. 27,473 | 9/1972 | Mauer | 351/44 X |
|---|---|---|---|
| 3,150,939 | 9/1964 | Wenner | 428/458 X |
| 3,382,136 | 5/1968 | Bugel et al. | 428/921 X |
| 3,681,179 | 8/1972 | Theissen | 428/336 |
| 3,682,528 | 8/1972 | Apfel et al. | 350/1.7 |
| 3,846,152 | 11/1974 | Franz | 350/1.7 X |
| 3,891,486 | 6/1975 | Willdorf | 350/1.7 X |
| 4,039,019 | 8/1977 | Hopper | 160/121 R |
| 4,089,996 | 5/1978 | Lange et al. | 427/160 |
| 4,123,586 | 10/1978 | Betts et al. | 428/921 X |
| 4,157,417 | 6/1979 | Murphy | 428/458 |
| 4,158,718 | 6/1979 | Kehl et al. | 428/523 X |
| 4,166,876 | 9/1979 | Chiba et al. | 428/216 X |
| 4,187,896 | 2/1980 | Shore | 160/121 R |

Primary Examiner—Harold Ansher
Attorney, Agent, or Firm—St. Onge, Steward, Johnston, Reens & Noë

[57] ABSTRACT

A composite sheet material exhibiting a low emittance characteristic at both of its outer surfaces for limiting radiant heat transmission therethrough comprises one composite sheet structure including a base layer of sheet material having high strength, resistance to tearing, stability, and body, and a first layer of material having a low emittance characteristic disposed in intimate contact with one surface of the base layer. A second composite sheet structure includes a protective layer of sheet material that is generally transparent to radiant energy in the infrared range of the energy spectrum and a second layer of material having a low emittance characteristic disposed in intimate contact with one surface of the protective layer. The composite sheet structures are bonded together with the second layer of material having low emittance facing the other surface of the base layer, that is with the first layer of material having low emittance forming one outer surface of the composite sheet material and the protective layer forming the other outer surface.

23 Claims, 2 Drawing Figures

COMPOSITE SHEET MATERIAL HAVING LOW EMITTANCE CHARACTERISTICS

BACKGROUND OF THE INVENTION

1. Field of the Invention

The present invention relates to a composite sheet material that exhibits low emittance characteristics at both of its outer surfaces for limiting radiant heat transmission therethrough. This sheet material may be used with particular advantage as one component of an insulating shade device described and claimed in U.S. Pat. No. 4,039,019 (Hopper). However, this sheet material may also be used in any other application in which a light weight, low mass sheet material is desired to minimize radiant heat transmission from one area to another.

2. Description of the Prior Art

Various film or sheet materials that inherently exhibit certain low emittance characteristics have been proposed in the past. For example, U.S. Pat. No. 3,775,226 (Windorf) discloses a solar control film that is a composite material of two outer polyester layers with an adhesive and a vacuum deposited aluminum metal layer interposed between them. The sheet material is attached by suitable means to a window and allegedly reduces the transmission of infrared, visible, and ultraviolet radiation from the sun through the window. U.S. Pat. No. 3,899,621 (Willdorf) discloses a similar sheet material that incorporates intermediate layers of polyurethane utilized as bonding strata. However, in each of the Windorf and Willdorf patents, polyester material comprises an outer coating to a metalized layer.

U.S. Pat. No. 3,565,752 (Grossman) discloses a material that incorporates a cryogenic adhesive joint and comprises aluminumized polyester films bonded with alkyl acrylate adhesive. The two metal layers are bounded by the two polyester layers and are joined together with the adhesive.

U.S. Pat. No. 3,516,720 (Mauer) discloses a thin film for coating sunglasses that incorporates a metal foil sandwiched between two layers of transparent material. U.S. Pat. No. 3,682,528 (Apfel et al.) discloses an infrared interference filter having a glass substrate, a precoat layer, a silver layer, a dielectric layer, another silver layer and another dielectric layer.

The materials described and illustrated in the prior art patents noted above are characterized by certain drawbacks.

SUMMARY OF THE INVENTION

It is an object of the present invention to provide a sheet material that is light in weight, has low mass and effectively minimizes transmission of radiant energy therethrough, particularly in the infrared range of the energy spectrum.

Moreover, it is an object of the present invention to provide a sheet material that is capable of being rolled on a cylinder thereby forming a window shade or a multilayer insulating window shade construction such as that disclosed in U.S. Pat. No. 4,039,019 (Hopper).

It is a further object of the invention to provide a sheet material that when used in such applications, is durable and has, therefore a long useful life.

It is another object of the present invention to provide such a sheet material that exhibits high strength and resistance to tearing, as well as body, stability and the ability to remain flat or planar with straight edges when extended, and to extend without ripples or other curvature.

In a preferred embodiment, the composite sheet material of the present invention exhibits low emittance at both of its outer surfaces and accordingly resists transmission of radiant energy therethrough, particularly in the infrared range of the energy spectrum. This material comprises two composite sheet structures, a first of which includes a first layer of metal, such as aluminum, gold, silver or copper, or any alloy of such metals which exhibits low emittance, that is vacuum deposited on one surface of a layer of polyester resin sheet material. The metal having low emittance provides the composite sheet material with its low emittance characteristic on one of its outer surfaces. A second composite layer structure of the sheet material comprises a protective polyethylene layer having a second layer of metal, exhibiting low emittance, deposited thereon. This second composite sheet structure is intimately joined to the first by a suitable adhesive with the metal layer that is vacuum deposited on the polyethylene facing the surface of the polyester layer opposite that on which the first metal layer is deposited. That is, the first metal layer forms one outer surface of the composite sheet material and the polyethylene forms the other outer surface.

It has been found that polyester material absorbs a substantial portion of infrared energy transmitted to it. Therefore, if polyester material is disposed on the outer surface of a metal layer, which itself exhibits low emittance, the total emittance in the infrared range of the energy spectrum on the side of the composite material bearing the polyester is greatly and undesirably increased. However, polyester does provide superior strength, resistance to tearing, body, stability, and good "lay-flat" characteristics.

It has also been found that polyethylene is generally transparent to infrared energy and, therefore, does not increase the emittance characteristic of a material deposited thereon, such as metal that itself exhibits low emittance, to an unacceptable degree. Accordingly, the composite sheet material of the present invention does provide low emittance characteristics at both of its outer surfaces, specifically on one outer surface because of the disposition of one metal layer on the outer surface of the polyester layer. Moreover, low emittance is also provided on the other outer surface of the composite sheet material by the intermediate metal layer vacuum deposited on the inner surface of the protective polyethylene layer which, as noted, is generally transparent to infrared radiant energy.

The composite sheet material of the present invention also provides a maximum desired, or "fail-safe," emissivity which is not exceeded even after extended use. This maximum emissivity is derived from the intermediate metal layer deposited on the inner surface of the protective polyethylene layer and will not be affected even if the first metal layer, vacuum deposited on the polyester layer, is completely degraded over an extended period of time during which the material is used.

In addition, while the polyester provides the material of the invention with strength, body and stability, the polyethylene layer provides a base to which other devices of a polymeric material may be welded using heat, ultrasonics, or other techniques.

Flame retardant materials and ultraviolet radiation inhibitors in the form of additives to the materials described above or other sheet layers may be included in the composite structures or in the adhesive joining the two multilayer composite sheet structures that comprise the composite sheet material of the present invention provided that the arrangement of the polyester and metal layers of one composite structure and of the metal and polyethylene layers in the outer composite structure is not altered.

Other objects, features and advantages of the present invention will be pointed out in or will be understood from the following detailed description provided below in conjunction with the accompanying drawing.

DETAILED DESCRIPTION OF THE PREFERRED EMBODIMENTS

Figure 1:
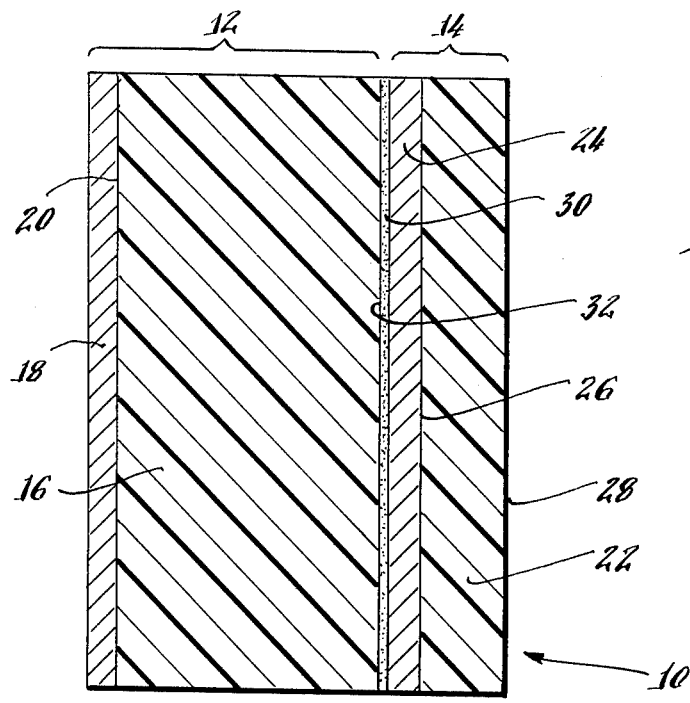
FIG. 1 is a cross-sectional view of the composite sheet material of the present invention greatly enlarged to show detail.

As shown in FIG. 1, the composite sheet material of the present invention, generally indicated at 10, comprises two composite layer structures 12 and 14 that intimately are joined or otherwise laminated or bonded together. The first composite layer structure 12 includes a base sheet layer 16 of a polymeric material that exhibits high strength, resistance to tearing, body and stability.

An outer layer 18 of a material that exhibits low emittance such as a metal is disposed in intimate contact with the outer surface 20 of the base layer 16.

In the preferred embodiment, the outer metal layer 18 comprises aluminum that is vacuum deposited on the base layer. Vacuum deposition techniques are well known. Moreover, aluminum exhibits the desirable low emittance characteristic, described below in greater detail, and is economically acceptable. Other materials that can be used as the outer layer 18 in practice of the invention include silver, gold and copper, and appropriate alloys of such metals.

It has been found that polyester, particularly that sold under the tradename "Mylar" by E. I. DuPont de Nemours Co., is preferable for the base layer 16. A base layer thickness of about 0.003 inch is satisfactory. However, the thickness of the base layer may range from about 0.002 inch to about 0.005 inch, depending upon the application of the composite sheet material 10. "Mylar" polyester sheet material exhibits the necessary strength, resistance to tearing, body and stability. It also exhibits good "lay-flat" characteristics; that is, it resists puckering, rippling, curling at the edges and the edges extend along straight lines rather than curved lines.

No material which would increase the low emittance characteristic or absorb significant amounts of radiant energy is placed on this outer metal layer 18. However, the metal layer 18 may be coated with a protective material provided that the total emittance exhibited by the layer 18 does not exceed about 0.1. With no protective coating, aluminum of 99.999% purity exhibits an emittance characteristic of about 0.03. Since the aluminum forms one outer surface of the composite sheet material 10, its emittance at that one surface may also be as low as 0.03 depending on the purity of the aluminum and its thickness. In any case, if the metal layer is not coated, its emittance should not exceed about 0.05.

The second composite layer 14 of the sheet material of the present invention comprises a protective layer 22 of material that is generally transparent to radiant energy, and particularly to energy in the infrared range of the energy spectrum. It is also desirable, especially when the sheet material is used in a device such as that disclosed in U.S. Pat. No. 4,039,019 (Hopper) that the protective layer 22 be capable of receiving other structures welded thereto by heat, ultrasonics or other techniques. In the preferred embodiment, this protective layer is made of polyethylene, which is available from St. Regis Paper Company and other suppliers. A thickness of the protective layer of about 0.001 inch to 0.00125 inch is satisfactory.

A second intermediate layer 24 of material such as aluminum, exhibiting low emittance, is vacuum deposited on one surface 26 of the protective layer 22.

It has been found that polyethylene is generally transparent to the infrared radiant energy as is specified above. Accordingly, the emittance characteristic on the outside surface 28 of the polyethylene layer is in the range of about 0.25 to 0.45 and in actual construction averages about 0.35.

The two composite layer structures 12 and 14 are intimately joined together by a suitable adhesive 30, such as is available from the Mobil Oil Corporation or Borden Corporation, with the intermediate metal layer 24 facing the surface 32 of the base layer 16 opposite the outer metal layer 18.

Accordingly, the outer metal layer 18 provides a low emittance characteristic at one side of the composite sheet material 10 of the invention, while the intermediate metal layer 24 provides a low emittance characteristic at the other side 28 of the composite sheet material. The intermediate metal layer 24 provides a "fail-safe" maximum emittance should the exposed metal layer 18 be completely degraded over an extended period of use of the material. Even given this "fail-safe" feature, it has been found that when the outer metal layer is of pure or nearly pure aluminum, little degradation of the emittance characteristic occurs over extended periods of time of normal usage in normal atmospheric conditions of the composite sheet material.

The sheet material 10 of the invention may also incorporate ultraviolet radiation inhibitors and flame retardants either as additives to the base layer 16 or protective layer 22 or as an additional layer or layers of material. However, when such inhibitors comprise additional layers they should be disposed between the composite layer structures 12 and 14 in the region of the adhesive so as not to alter the low emittance characteristics described above.

Figure 2:
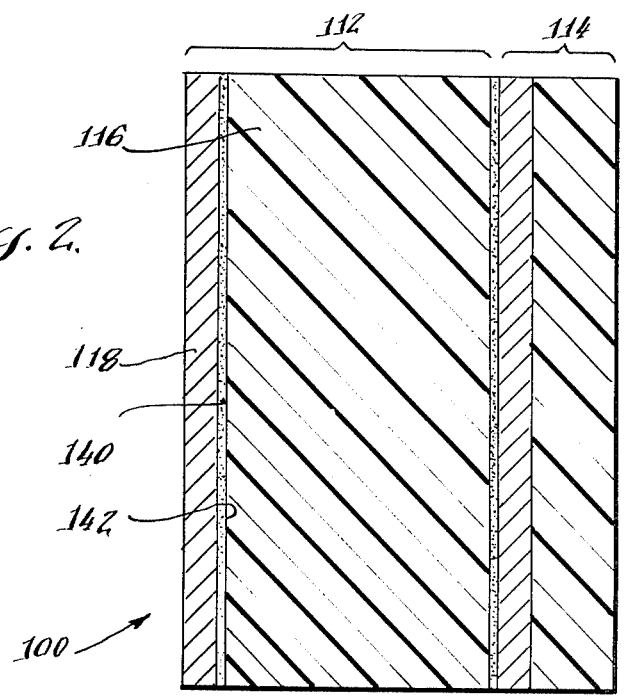
FIG. 2 is a cross-sectional view of a second embodiment of the composite sheet material of the invention, also greatly enlarged.

FIG. 2 shows a second embodiment of the sheet material of the present invention, generally indicated at 100, which also incorporates composite sheet structures 112 and 114. The second composite structure 114 is identical to structure 14 described with reference to the first embodiment. However, the first composite structure 112, rather than having metal layer vacuum deposited on the outer surface of a base layer, comprises a metal foil layer 118 bonded by a suitable adhesive 140 to the outer surface 142 of the base layer 116. Such a construction may be desirable where large amounts of metal are desired as the outer metal layer. The metal foil 118 may be, for example, of aluminum, gold, silver, copper or alloys of such metals that exhibit the desired low emittance characteristic.

Accordingly, although specific embodiments of the present invention have been described above in detail, it is to be understood that this is for purposes of illustration. Modifications may be made to the described sheet material structures in order to adapt them to particular applications.

What is claimed is:

1. A composite flexible, rollable sheet material having a low emittance characteristic at both of its outer surfaces for limiting radiant energy transmission therethrough comprising:

a base layer of flexible, rollable, high strength, tear resistant material, an outer layer, disposed in intimate contact with one surface of said base layer, having a low emittance characteristic;

a protective layer of flexible, rollable material dissimilar from said base layer material and substantially transparent to radiant energy in the infrared range of the energy spectrum;

an intermediate layer disposed in intimate contact with one surface of said protective layer, also having a low emittance characteristic; and bonding means for intimately joining said intermediate layer to said base layer.

2. The composite sheet material as claimed in claim 1, wherein said protective layer material comprises polyethylene.

3. The composite sheet material as claimed in claim 1, wherein said base layer material comprises polyester resin sheet material.

4. The composite sheet material as claimed in claim 1, wherein said outer layer comprises one of said outer surfaces of said composite sheet material, the emittance of which does not exceed about 0.05.

5. The composite sheet material as claimed in claim 1, wherein said protective layer comprises one of said outer surfaces of said composite sheet material, said intermediate layer having a low emittance characteristic and said protective layer material being substantially transparent to radiant energy in the infrared range of the energy spectrum such that the emittance of said one outer surface of said composite sheet material does not exceed about 0.45.

6. The sheet material as claimed in claim 1, wherein said outer layer is made of a metal selected from the group consisting of aluminum, silver, gold and copper and alloys of such metals.

7. The composite sheet material as claimed in claim 6, wherein said metal of which said outer layer is made is vacuum deposited on said base layer.

8. The composite sheet material as claimed in claim 6, wherein said outer layer comprises a layer of foil of said metal bonded to said base layer.

9. The composite sheet material as claimed in claim 1, wherein said intermediate layer is made of a metal selected from the group consisting of aluminum, silver, gold and copper and alloys of such metals.

10. The composite sheet material as claimed in claim 9, wherein said metal of which said intermediate layer is made is vacuum deposited on said protective layer.

11. A composite flexible, rollable sheet material having a low emittance characteristic at both of its outer surfaces for limiting radiant energy transmission therethrough, comprising:

a base layer of flexible, rollable, high strength, tear resistant polyester resin sheet material;

an outer layer, disposed in intimate contact with one surface of said base layer, thereby comprising one of said outer surfaces of said composite sheet material and having a low emittance characteristic such that the emittance of said one outer surface of said composite sheet material does not exceed about 0.05;

a protective layer of flexible, rollable material dissimilar from said base layer material and substantially transparent to radiant energy in the infrared range of the energy spectrum;

an intermediate layer, disposed in intimate contact with one surface of said protective layer; and bonding means for intimately joining said intermediate layer to said base layer, said protective layer thereby comprising the other of said outer surfaces of said composite sheet material, said intermediate layer having a low emittance characteristic and said protective layer material being substantially transparent to radiant energy in the infrared range of the energy spectrum such that the emittance of said other outer surface of said composite sheet material does not exceed about 0.45.

12. The composite sheet material as claimed in claim 11 wherein said protective layer material comprises polyethylene.

13. The composite sheet material as claimed in claim 11, wherein said outer layer is made of a metal selected from the group consisting of aluminum, silver, gold and copper and alloys of such metals.

14. The composite sheet material as claimed in claim 13, wherein said metal of which said outer layer is made is vacuum deposited on said base layer.

15. The composite sheet material as claimed in claim 13, wherein said outer layer comprises a layer of foil of said metal bonded to said base layer.

16. The composite sheet material as claimed in claim 11, wherein said intermediate layer is made of a metal selected from the group consisting of aluminum, silver gold and copper and alloys of such metals.

17. The composite sheet material as claimed in claim 16, wherein said metal of which said intermediate layer is made is vacuum deposited on said protective layer.

18. A composite sheet material having a low emittance characteristic at both of its outer surfaces for limiting radiant energy transmission therethrough, comprising:

a base layer of polyester resin sheet material;

an outer layer, disposed in intimate contact with one surface of said base layer, made of a metal selected from the group consisting of aluminum, silver, gold and copper and alloys of such metals and having a low emittance characteristic;

a protective layer of polyethylene which is substantially transparent to radiant energy in the infrared range;

an intermediate layer, disposed in intimate contact with one surface of said protective layer, made of a metal selected from the group consisting of aluminum, silver, gold and copper and alloys of such metals and thereby also having a low emittance characteristic and adhesive means for intimately joining said intermediate layer to said base layer.

19. The composite sheet material as claimed in claim 18, wherein said metal of which said outer layer is made is vacuum deposited on said base layer.

20. The composite sheet material as claimed in claim 18, wherein said metal of which said intermediate layer is made is vacuum deposited on said protective layer.

21. The composite sheet material as claimed in claim 18, wherein said outer layer comprises a layer of foil of said metal bonded to said base layer.

22. The composite sheet material as claimed in claim 18, 19, 20, or 21, wherein said outer layer comprises one of said outer surfaces of said composite sheet material, the emittance of which does not exceed about 0.05.

23. The composite sheet material as claimed in claim 18, 19, 20, or 21, wherein said protective layer comprises one of said outer surfaces of said composite sheet material, said intermediate layer having a low emittance characteristic and said protective layer being substantially transparent to radiant energy in the infrared range of the energy spectrum such that the emittance of said one outer surface of said composite sheet material does not exceed about 0.45.

* * * * *